United States Patent
Tornatore

(10) Patent No.: US 7,794,845 B2
(45) Date of Patent: Sep. 14, 2010

(54) METALLIZED PROPYLENE POLYMER FILM WITH GOOD BARRIER RETENTION PROPERTIES

(75) Inventor: Massimo Tornatore, Ferrara (IT)

(73) Assignee: Basell Poliolefine Italia s.r.l., Milan (IT)

(*) Notice: Subject to any disclaimer, the term of this patent is extended or adjusted under 35 U.S.C. 154(b) by 103 days.

(21) Appl. No.: 11/988,526

(22) PCT Filed: Jun. 29, 2006

(86) PCT No.: PCT/EP2006/063682

§ 371 (c)(1), (2), (4) Date: Jan. 9, 2008

(87) PCT Pub. No.: WO2007/006657

PCT Pub. Date: Jan. 18, 2007

(65) Prior Publication Data

US 2009/0075104 A1    Mar. 19, 2009

Related U.S. Application Data

(60) Provisional application No. 60/698,418, filed on Jul. 12, 2005.

(30) Foreign Application Priority Data

Jul. 11, 2005  (EP) .................................. 05106293

(51) Int. Cl.
    B32B 27/00    (2006.01)
    B32B 27/08    (2006.01)
    C08J 7/18     (2006.01)

(52) U.S. Cl. .................. 428/461; 428/516; 427/532
(58) Field of Classification Search ................ 428/461, 428/516
    See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,785,374 A * | 11/1988 | Nagai et al. | 361/305 |
| 4,971,937 A | 11/1990 | Albizzati et al. | |
| 5,221,651 A | 6/1993 | Sacchetti et al. | |
| 5,336,746 A * | 8/1994 | Tsutsui et al. | 526/348.6 |
| 5,698,642 A | 12/1997 | Govoni et al. | |
| 5,725,962 A | 3/1998 | Bader et al. | |
| 6,063,483 A * | 5/2000 | Peiffer et al. | 428/213 |
| 6,127,304 A | 10/2000 | Sacchetti et al. | |

(Continued)

FOREIGN PATENT DOCUMENTS

EP    45977    2/1982

(Continued)

*Primary Examiner*—Kevin R. Kruer
(74) *Attorney, Agent, or Firm*—Jarrod N. Raphael

(57) ABSTRACT

Multilayer polypropylene films comprising a base layer A, at least one skin layer B adhered to said base layer A and a metal layer M deposited on the surface of said skin layer, wherein said skin layer B comprises a propylene copolymer containing from 3% to 6% by weight of $C_4$-$C_{10}$ alpha-olefin units, said propylene copolymer having a xylene soluble fraction at 23° C. of less than 4.0 wt %, a VICAT softening temperature higher than 135° C. and an indentation value according to the VICAT test method lower than or equal to 0.05 mm at 120° C.

12 Claims, 1 Drawing Sheet

U.S. PATENT DOCUMENTS

Figure 1:
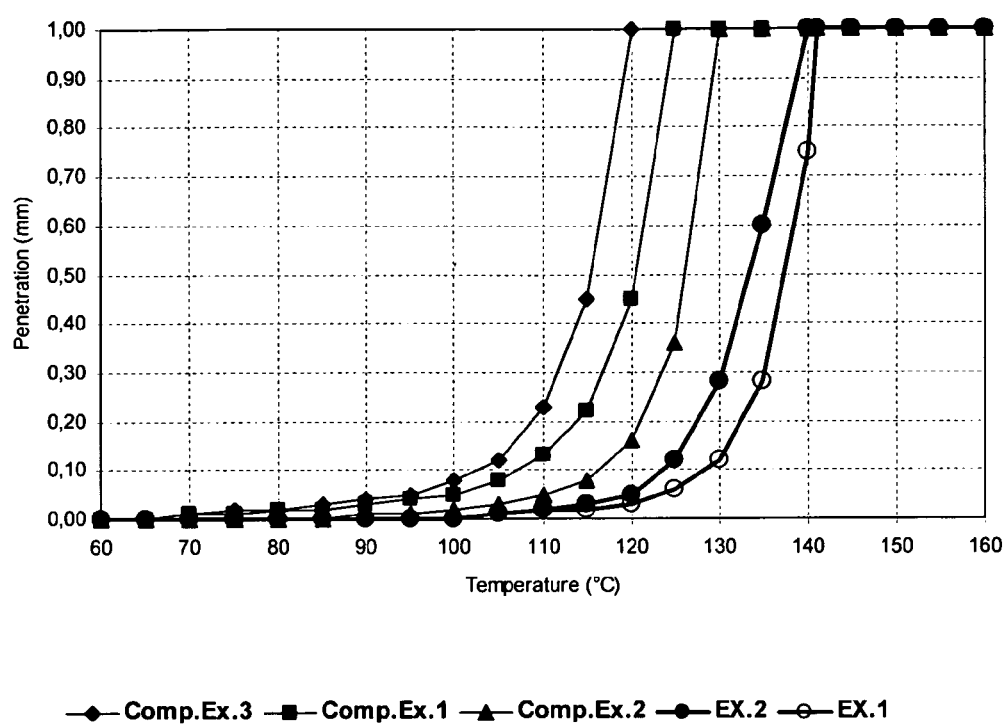

| | | |
|---|---|---|
| 6,323,152 B1 | 11/2001 | Sacchetti et al. |
| 6,407,028 B1 | 6/2002 | Sacchetti et al. |
| 6,413,477 B1 | 7/2002 | Govoni et al. |
| 6,437,061 B1 | 8/2002 | Sacchetti et al. |
| 6,537,652 B1 * | 3/2003 | Kochem et al. ............. 428/220 |
| 6,541,570 B2 | 4/2003 | Beccarini et al. |
| 6,686,307 B2 | 2/2004 | Sacchetti et al. |
| 6,689,845 B1 | 2/2004 | Govoni et al. |
| 6,818,187 B2 | 11/2004 | Govoni et al. |
| 6,818,583 B1 | 11/2004 | Morini et al. |
| 6,825,309 B2 | 11/2004 | Morini et al. |
| 7,022,640 B2 | 4/2006 | Morini et al. |
| 7,049,377 B1 | 5/2006 | Morini et al. |
| 7,169,871 B2 | 1/2007 | Morini et al. |
| 2002/0095015 A1 * | 7/2002 | Oliva et al. ................. 526/160 |

FOREIGN PATENT DOCUMENTS

| | | |
|---|---|---|
| EP | 361494 | 4/1990 |
| EP | 395083 | 10/1990 |
| EP | 728769 | 8/1996 |
| EP | 782587 | 7/1997 |
| EP | 1153080 | 11/2001 |
| EP | 1272533 | 1/2008 |
| WO | 96/38299 | 12/1996 |
| WO | 97/11846 | 4/1997 |
| WO | 98/44009 | 10/1998 |
| WO | 00/02929 | 1/2000 |

* cited by examiner

METALLIZED PROPYLENE POLYMER FILM WITH GOOD BARRIER RETENTION PROPERTIES

This application is the national stage filing of PCT application PCT/EP2006/063682, filed on Jun. 29, 2006, which claims priority to European Patent Office application 05106293.3 filed Jul. 11, 2005.

This invention relates to metallized biaxially oriented propylene polymer films having good barrier retention properties which render them particularly suitable for food packaging. Biaxially oriented polypropylene (BOPP) films, single or multilayered, are commonly used for food packaging. Said films show several favourable properties but they also have the drawback of a low barrier to oxygen and moisture. To improve barrier properties, it is well known in the art to deposit on the surface of BOPP films a metal coating. The polyolefinic surface is sometimes treated with corona, flame or plasma treatments prior to metal deposition in order to allow the adhesion of the metal to the surface. The metallized layer can be subsequently coated and/or laminated with a further plastic film by extrusion coating, extrusion lamination or adhesive lamination. In extrusion lamination a layer of molten resin is dropped between the BOPP film and the plastic film which is laminated onto it, said molten resin acting as adhesive layer. In lamination and coating processes the metallized surface undergoes a significant thermal stress which may cause the degradation (fracture) of the metal layer and the consequent loss of the barrier properties.

Several propylene polymer compositions are known in the art which are suitable as metallizable layers for BOPP films.

The European Patent EP1153080 describes semicrystalline polyolefin compositions comprising a blend of three different copolymers of propylene and a $C_4$-$C_{10}$ alpha-olefin, where the total content of recurring units from $C_4$-$C_{10}$ alpha-olefin is $\geq$ 6 wt %. Said polyolefin compositions have a VICAT value generally of 125-135° C. and possess good barrier to oxygen and water vapour transmission.

The International Patent Application WO 97/11846 describes a multilayer biaxially oriented polyolefin film having a bonding layer comprising a mixture of 40-100% of propylene/1-butene copolymer containing up to 14 wt % of 1-butene, said bonding layer being suitable for metallization and subsequent extrusion lamination.

Even tough said compositions are suitable for subsequent extrusion or coating, the compositions known in the art show unsatisfactory retention of the barrier properties of the BOPP films after extrusion or coating processes.

It was therefore an object of the present invention to provide metallized multilayer propylene polymer films having good barrier properties that additionally, when submitted to post-converting processes such as extrusion coating, extrusion lamination or adhesive lamination, maintain the barrier properties.

Therefore, the present invention provides multilayer polypropylene films comprising a base layer A, at least one skin layer B adhered to said base layer A and a metal layer M deposited on the surface of said skin layer, wherein said skin layer B comprises a propylene copolymer containing from 3% to 6% by weight of $C_4$-$C_{10}$ alpha-olefin units, said propylene copolymer having a xylene soluble fraction at 23° C. of less than 4.0 wt %, a VICAT softening temperature higher than 135° C. and an indentation value according to the VICAT test method equal to or lower than 0.05 mm at 120° C.

The VICAT softening temperature and indentation value are measured according to ISO norm 306, condition A50. The xylene soluble fraction is determined according to the method described below. The percentages by weight of the $C_4$-$C_{10}$ alpha-olefin units are based on the sole propylene copolymer B.

The propylene/$C_4$-$C_{10}$ alpha-olefin copolymers of the skin layer B of the multilayer propylene polymer films of the invention preferably have:
- content of $C_4$-$C_{10}$ alpha-olefin units from 4% to 6% by weight; and/or
- xylene soluble fraction at 25° C. of less than 2.0 wt %; and/or
- VICAT softening temperature higher than 139° C.; and/or
- indentation value according to VICAT test method lower than or equal to 0.03 mm at 120° C.

More preferably, the propylene/$C_4$-$C_{10}$ alpha-olefin copolymers of the skin layer B of the multilayer propylene polymer films of the invention may further have the one or more of the following properties:
- melting temperature measured by DSC higher than 150° C., still preferably in the range from 150° to 155° C.; and/or
- melt flow rate (MFR) value from 0.1 to 10 g/10 min, measured according to ISO 1133 (230° C., 2.16 Kg), still more preferably from 1.0 to 6.0 g/10 min.

The propylene/$C_4$-$C_{10}$ alpha-olefin copolymers of the skin layer B of the multilayer films of the invention show good metal adhesion and improved stability of the metal layer after converting steps, such as extrusion coating, extrusion lamination or adhesive lamination, if compared to propylene polymers conventionally used for metallized films.

For the preparation of the propylene copolymers, propylene units are polymerized in the presence of at least one alpha-olefin having 4 to 10 carbon atoms. Preferred alpha-olefins are linear $C_4$-$C_{10}$-1-alkenes. Particularly preferred are 1-butene, 1-pentene, 1-hexene, 1-heptene, 1-octene, 4-methyl-1-pentene, 1-butene being particularly preferred.

Said propylene/$C_4$-$C_{10}$ alpha-olefin copolymers can be prepared by various known methods. The polymerization process can be carried out in gas phase and/or in liquid phase, in continuous or batch reactors, such as fluidized bed or slurry reactors, or alternatively the gas-phase polymerization process can carried out in at least two interconnected polymerization zones, as described in the European patent EP782587 and International Patent Application WO00/02929. The reaction time, temperature and pressure of the polymerization steps are not critical per se, however the temperature ranges usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene copolymers ca be conveniently regulated by using known regulators, such as hydrogen.

The polymerization can be carried out in presence of a highly stereo specific heterogeneous Ziegler-Natta catalyst. The Ziegler-Natta catalysts suitable for producing the propylene/$C_4$-$C_{10}$ alpha-olefin copolymers of the skin layer B of the present invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261.

Preferably, the solid catalyst component comprises Mg, Ti, halogen and an electron donor (internal donor) selected from alkyl, cycloalkyl or aryl esters of mono- or dicarboxylic acids. Particularly preferred are mono- and diesters of aromatic dicarboxylic acids having the —COOH groups into ortho position, wherein at least one of the R hydrocarbyl radical of the —COOR groups contains from 3 to 20 carbon atoms. Preferably the electron donor is selected from diisobutyl-2,3-naphthalen-dicarboxylate, di-n-propyl, di-n-butyl, diisobutyl, di-n-heptyl, di-2-ethylhexyl, di-n-octyl, di-neopentil phthalates, monobutyl and monoisobutyl esters of phthalic acid, ethyl-isobutylphthalate, ethyl-n-butyl-phthalate as described in European patents EP45977 and EP728769.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form according to U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal donor is used in molar ratio with respect to the $MgCl_4$ of from 0.01 to 1 preferably from 0.05 to 0.5. The preparation of catalyst components in spherical form is described for example in European patent application EP-A-395083 and in the International patent application WO98/44009.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1-trifluoropropyl-2-ethylpiperidinyl-dimethoxysilane and 1,1,1-trifluoropropyl-metildimethoxysilane. The external electron donor compound is used in such an amount to give a molar ratio between the organo-aluminum compound and said electron donor compound of from 0.1 to 500.

The propylene copolymers of the skin layer B of the metallized multilayer films of the invention may also contain one or more additives normally used in the art, such as stabilizers, antiblocking or slip agents, acid scavengers, clarifiers, lubricants and mold release agents, fillers, nucleating agents, antistatics, plasticizers, flame retardants and pigments, normally in an amount up to 5 wt %, preferably up to 2 wt %. In general, these are incorporated during granulation of the polymeric product obtained in the polymerization. Customary stabilizers include antioxidants such as sterically hindered phenols, sterically hindered amines or LTV stabilizers, processing stabilizers such as phosphites or phosphonites, acid scavengers such as calcium stearate or zinc stearate or hydrotalcite, as well as calcium, zinc and sodium caprylate salts.

Possible fillers are, for example, talc, chalk or glass fibers. Examples of suitable nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_9$-alkyl-substituted derivatives.

Suitable acid scavengers are for example synthetic hydrotalcite, sodium or calcium stearates and SHT. Preferred antiblocking agents are silica and silicates, zeolites, kaolins and PMMA. In a preferred embodiment, the multilayer propylene polymer films of the invention comprise a base layer A, at least one skin layer B adhered to said base layer A and a metal layer M deposited on the surface of said skin layer, wherein said skin layer B consists of:

(I) 100 parts by weight of a propylene copolymer containing from 3% to 6% by weight of $C_4$-$C_{10}$ alpha-olefin units, said propylene copolymer having a xylene soluble fraction at 23° C. of less than 4.0 wt %, a VICAT softening temperature higher than 135° C. and an indentation value according to the VICAT test method lower than or equal to 0.05 mm at 120° C. and (II) up to 0.25 parts by weight, preferably up to 0.18, of at least one additive selected among stabilizers, acid scavengers, antiblocking agents and nucleating agents.

More preferably, the alpha-olefin of the copolymer (I) is 1-butene.

In a further embodiment of the metallized multilayer films of the invention, the skin layer B comprises a polyolefin composition comprising (1) a propylene copolymer containing from 3% to 6% by weight of $C_4$-$C_{10}$ alpha-olefin units, said propylene copolymer having a xylene soluble fraction at 23° C. of less than 4.0 wt %, a VICAT softening temperature higher than 135° C. and an indentation value according to the VICAT test method lower than or equal to 0.05 mm at 120° C. and (2) a polyolefin selected among propylene homopolymers, propylene copolymers with at least one alpha-olefin having from 2 to 8 carbon atoms other than propylene. The amount of the polyolefin (2) may range from 0.5 to 50 wt % (based on the final composition), preferably from 2.0 to 35 wt %, more preferably from 5.0 to 15.0 wt %.

The thickness of the at least one skin layer B of the metallized multilayer films of the invention is preferably up to 5.0 micron, more preferably from 0.6 to 3.0 micron, particularly preferably from 0.8 to 1.5 micron.

The skin layer B of the metallized multilayer films of the invention comprising a propylene/$C_4$-$C_{10}$ alpha-olefin copolymer having the peculiar comonomer content, VICAT softening temperature and indentation value according to the VICAT test method as claimed in claim 1 is an excellent receiving layer for the subsequent metallization, allowing the obtainment of a smooth surface which ends up in a regular and compact metal deposition with good adhesion of the metal to the skin. Additionally, said skin layer provides metallized films with superior retention of the barrier properties, i.e. the compactness and regularity of the metal layer deposited on the skin surface are not adversely affected by the converting processes such as extrusion coating, extrusion lamination or adhesive lamination.

The base layer A can comprise any olefin polymer conventionally used as base layer for multilayer propylene polymer films. Preferably, the base layer A comprises crystalline propylene homo- or copolymers containing up to 5 wt % of $C_2$-$C_{10}$ alpha-olefin units other than propylene. Particularly preferred alpha-olefins are ethylene, 1-butene, 1-pentene, 1-hexene, 1-heptene, 1-octene and 4-methyl-1-pentene. By "crystalline propylene homo- or copolymers" is meant therein propylene homo- or copolymers having xylene-soluble fraction at 25° C. of less than 5 wt %. Particularly preferably, the base layer comprises a propylene homopolymer having the following set of properties:

xylene soluble fraction at 25° C. of less than 5 wt %, preferably of less then 2 wt %; and/or tensile modulus higher than 1500 MPa, preferably higher than 1700 MPa; and/or Vicat softening temperature (ISO 306, A50 (50° C./h 10N)) higher than 155° C., preferably higher than 158° C.; and/or Melt Flow Rate ranging from 0.6 to 5.0 g/10 min, preferably from 1.5 to 3.5 g/10 min; and/or Polydispersity Index higher than 5, more preferably ranging from 5 to 10.

Base layers A comprising the a propylene homopolymer having the above-mentioned set of properties are endowed with high stiffness.

The crystalline propylene homo- or copolymers of the base layer A can be prepared by various known methods. The polymerization process can be carried out in gas phase and/or in liquid phase, in continuous or batch reactors, such as fluidized bed or slurry reactors, or alternatively the gas-phase polymerization process can carried out in at least two interconnected polymerization zones, as described in the European patent EP782587 and International Patent Application WO00/02929. The reaction time, temperature and pressure of the polymerization steps are not critical per se, however the temperature ranges usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene copolymers can be conveniently regulated by using known regulators, such as hydrogen.

The polymerization can be carried out in presence of a highly stereospecific heterogeneous Ziegler-Natta catalyst. The Ziegler-Natta catalysts suitable for producing the propylene/$C_4$-$C_{10}$ alpha-olefin copolymers of the skin layer of the metallized multilayer films of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound. Suitable catalysts systems are described in the European patents EP45977, EP361494, EP728769, EP 1272533 and in the international patent application WO00/63261.

The crystalline propylene homo- and copolymers of the base layer A may also contain one or more additives normally used in the art, such as stabilizers, antiblocking or slip agents, acid scavengers, clarifiers, lubricants and mold release agents, fillers, nucleating agents, antistatics, plasticizers, flame retardants, pigments and cavitating agents such as $CaCO_3$, normally in an amount up to 5 wt %, preferably up to 2 wt %. Preferably, the base layer A is calcium stearate free.

The thickness of the base layer A of the metallized multilayer films of the invention is preferably up to 100 micron, more preferably from 5 to 60 micron, particularly preferably from 8 to 40 micron.

The multilayer propylene polymer films of the invention further comprise a metal layer M deposited onto the surface of the skin layer 6 opposite to the surface adhered to the base layer A. The metal layer may comprise titanium, vanadium, chromium, manganese, iron, cobalt, nickel, copper, zinc, aluminium, gold, palladium or mixtures thereof, an aluminium metal layer being preferred. Preferably, optical density of the metallized film ranges from 0.5 to 4.0. The metallized multilayer propylene polymer of the invention can be prepared by any process conventionally used in the art for producing polypropylene coextruded films. Preferably, in a first step (i) the base layer A and the at least one skin layer 8 are coextruded, i.e. simultaneously extruded through a multi-layer or multi-slot die, contacted in the molten state and subsequently permanently bonded by cooling the molten mass. After coextrusion and prior to metallization, the surface of the skin layer to be metallized is treated in a step (ii) to promote the metal adhesion. Suitable surface treatments already known in the art are corona-discharge method, corona-discharge in a controlled atmosphere, flame treatment or vacuum plasma treatment, the flame treatment being preferred. After the surface treatment, the metal layer M is formed onto the surface of the treated skin layer in a subsequent step (iii) using any known metallizing technique, such as sputtering and vapour-deposition, the vapour-deposition being preferred. Vapour-deposition involves the thermal evaporation and subsequent condensation of a metal onto the skin layer, generally under vacuum conditions.

The metallized multilayer polypropylene films of the invention can undergo a post-converting treatment selected among extrusion coating, extrusion lamination or adhesive lamination in a further step (iv) subsequent to the metallization step (iii). In extrusion coating a further layer is applied onto the metal layer M, coating said metal layer M by a molten resin and subsequently cooling the coated multilayer metallized film. Lamination of the coated metal surface with a further substrate can be accomplished simultaneously (extrusion lamination). Depending on the end use of the metallized multilayer polypropylene film of the invention, different resins can be used for coating the metallized surface. Suitable coating resins are for example polyethylene having density in the range from 0.880 g/cm$^3$ to 0.970 g/cm$^3$, polyethylenes modified with maleic anhydride as well as single- or multilayer polyethylene films.

In adhesive lamination, the metallized multilayer film and a further substrate are sandwiched together with a layer of adhesive material between them.

By extrusion or adhesive lamination plastic or non-plastic substrates can be bonded to the metallized surface of the multilayer polypropylene films of the invention. Suitable plastic substrates are for example single- or multilayer polypropylene, polyethylene or PET films, either oriented or un-oriented.

Coating resins, adhesives and laminating substrates are commonly available on the market. Prior to metallization, the multilayer polypropylene films of the present invention are preferably oriented. Orientation can be accomplished using well known processes for the manufacturing of oriented films, i.e. the double-bubble (or tubular) process, the tenter process (conventional or modified tenter-line) or simultaneous stretching technologies, such as LISIM® Technology. Preferably, the multilayer films of the invention are biaxially oriented by the tenter process, sequentially stretching the film in the machine direction (MD) and in the direction across the machine axis (transverse direction, TD). The MD and TD stretching can be equal (balanced orientation) or different; the stretching ratios are preferably 2 to 10, more preferably 3 to 7 in MD and from 5 to 15, more preferably from 6 to 12, particularly preferably from 8 to 10 in TD.

According to a first embodiment, the metallized multilayer polypropylene films of the invention may have a C/A/B//M structure. In this first embodiment, the metallized multilayer propylene polymer films of the invention may comprise at least one further layer C adhered to the surface of the base layer A opposite to the surface adhered to the skin layer B. According to the end use of the film, said at least one further layer C may comprise at least one olefin polymer selected among:

(i) isotactic or mainly isotactic propylene homopolymers and homo- or copolymers of ethylene, such as HDPE, LDPE and LLDPE;

(ii) copolymers of propylene with ethylene and/or alpha-olefins having 4 to 10 carbon atoms, such as 1-butene, 1-hexene, 4-methyl-1-pentene, 1-octene, wherein the total comonomer content ranges from 0.05 to 20 wt % with respect to the weight of the copolymer, or mixtures of said copolymers with isotactic or mainly isotactic propylene homopolymers;

(iii) elastomeric copolymers of ethylene with propylene and/ or an alpha-olefin having 4 to 10-carbon atoms, optionally containing minor quantities (in particular, from 1% to 10 wt %) of a diene, such as butadiene, 1,4-hexadiene, 1,5-hexadiene, ethylidene-1-norbornene;

(iv) heterophasic copolymers comprising (1) a propylene homopolymer and/or one of the copolymers of item (ii), and (2) an elastomeric fraction comprising one or more of the copolymers of item (iii), typically prepared according to known methods by mixing the components in the molten state, or by sequential polymerization, said heterophasic copolymer generally containing the said elastomeric fraction in quantities from 5% to 80 wt % with respect to the weight of the heterophasic copolymer;

(v) 1-butene homopolymers or copolymers with ethylene and/or alpha-olefins having 5 to 10-carbon atoms;

(vi) the propylene copolymer of the skin layer B;

(vii) mixtures thereof.

In a particularly preferred embodiment, the at least one further layer C comprises a propylene polymer composition comprising:

(I) 20-80 wt %, preferably 20-60 wt %, more preferably 30-50 wt %, of one or more propylene copolymers selected from the group consisting of (I-1) propylene/ethylene copolymers containing 1-7 wt % of ethylene; (I-2) copolymers of propylene with one or more $C_4$-$C_8$ alpha-olefins, containing 2-10 wt % of the $C_4$-$C_8$ alpha-olefins; (I-3) copolymers of propylene with ethylene and one or more $C_4$-$C_8$ alpha-olefins, containing 0.5-4.5 wt % of ethylene and 2-6 wt % of $C_4$-$C_8$ alpha-olefins, provided that the total content of ethylene and $C_4$-$C_8$ alpha-olefins in (I-3) be equal to or lower than 6.5 wt %;

(II) 20-80 wt %, preferably 40-80 wt %, more preferably 50-70 wt %, of one or more propylene copolymers selected from the group consisting of (II-1) copolymers of propylene with one or more $C_4$-$C_8$ alpha-olefins, containing from more than 10 wt % to 30 wt % of $C_4$-$C_8$ alpha-olefins; (II-2) copolymers of propylene with ethylene and one or more $C_4$-$C_8$ alpha-olefins, containing 1-7 wt % of ethylene and 6-15 wt % of $C_4$-$C_8$ alpha-olefins.

The above-mentioned polymers of the layer C may comprise customary additives known to those skilled in the art, e.g. stabilizers, clarifiers, antiacids, antiblocking agents, lubricants such as silicones and silicone oils, mould release agents, fillers, nucleating agents, antistatics, plasticizers, dyes, pigments or flame retardants.

The metallized multilayer propylene polymer films comprising said at least one further layer C adhered to the surface of the base layer A opposite to the surface adhered to the skin layer B are conveniently prepared by coextruding said at least one further layer in the first step (i). In a second embodiment, the metallized multilayer polypropylene film of the invention has a C/A'/A/A"/B//M, wherein the intermediate layers A' and A", which can be equal or different, comprise a polyolefin or a polyolefin composition selected among propylene homopolymers, propylene copolymers with at least one alpha-olefin having from 2 to 8-carbon atoms other than propylene and mixtures thereof; A, B, C and M are the layers described herein above.

The metallized multilayer polypropylene films having C/A/B//M or C/A'/A/A"/B//M structure have generally an overall thickness of less than 150 micron, preferably of less than 100 micron.

The metallized multilayer propylene polymer films of the invention have good barrier to the transmission of oxygen and water vapour and are therefore particularly suitable for food packaging, i.e. for packaging of oily foods such as fries and snacks.

The following methods have been used to determine the properties reported in the description and in the examples:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Comonomer Content
By IR spectroscopy.

VICAT Softening Temperature
ISO 306, condition A50.

Melting Temperature, Melting Enthalpy and Crystallization Temperature
Determined by DSC with a temperature variation of 20° C. per minute Melt Flow Rate (MFR)
Determined according to ISO 1133 (230° C., 2.16 Kg)

Tensile Modulus (MET)
ISO 527-1, -2, 1 mm/min

Flexural Modulus
ISO 178

Polydispersity Index PI
Determined at a temperature of 200° C. by using a parallel plates rheometer model RMS-800 marketed by RHEOMETRICS (USA), operating at an oscillation frequency which increases from 0.1 rad/scc to 100 rad/scc. From the crossover modulus one can derive the PI by way of the equation:

$$PI=10^5/Gc$$

in which Gc is the crossover modulus which is defined as the value (expressed in Pa) at which G'=G" wherein G' is the storage modulus and G" is the loss modulus.

The following examples are given to illustrate and not to limit the invention.

EXAMPLE 1 AND 2

For the preparation of the propylene copolymers of the skin layer B a Ziegler-Natta catalyst was used prepared according to the Example 5, lines 48-55 of the European Patent EP728769. The propylene copolymers were prepared by polymerizing propylene and 1-butene in the presence of Triemylaluminium as co-catalyst and dicyclopentyldimethoxysilane as external donor. The polymerization was carried out in liquid phase, in two continuous loop reactors in series. The Al-alkyl/external donor ratio was kept in the range from 1.5 to 2.2. The temperature in the first and second loop was maintained in the range from 69° to 71° C. The polymer particles exiting from the second loop were subjected to a steam treatment to remove the unreacted monomers, dried and granulated in a conventional equipment. During granulation 420 ppm of Irganox 1010 (by Ciba Specialty Chemicals S.p.A.), 840 ppm of Irgafos 168 (by Ciba Specialty Chemicals S.p.A.) and 340 ppm of hydrotalcite were added. The properties of the obtained propylene/1-butene copolymers are collected in Table 1.

COMPARATIVE EXAMPLE 1

For the skin layer B a semicrystalline polyolefin composition according to European Patent EP1153080 was used comprising a blend of three different propylene/1-butene copolymers having a total 1-butene content of 11.5 wt %. The composition was added with Irganox 1010 (Ciba Specialty Chemicals) 500 ppm, Irgafos 168 (Ciba Specialty Chemicals) 1000 ppm, Ca-stearate 500 ppm and Silica 1000 ppm during granulation.

COMPARATIVE EXAMPLE 2

For the skin layer B a propylene/1-butene copolymer was used having the properties indicated in Table 1. The copolymer was added with Irganox 1010 (Ciba Specialty Chemicals) 500 ppm, Irgafos 168 (Ciba Specialty Chemicals) 1000 ppm, Ca-stearate 500 ppm and Silica 1700 ppm during granulation.

COMPARATIVE EXAMPLE 3

For the skin layer B a propylene/ethylene/1-butene terpolymer was used having the properties indicated in Table 1. The copolymer was added with Irganox 1010 (Ciba Specialty Chemicals) 1000 ppm, Irgafos 168 (Ciba Specialty Chemicals) 1000 ppm, Ca-stearate 500 ppm and Silica 1000 ppm. during granulation.

On FIG. 1 are reported the VICAT curves of the propylene copolymers of the Examples 1 and 2 according to the invention and that of the propylene copolymers of the Comparative Examples from 1 to 3. The VICAT curves indicate that the propylene copolymers of the invention have a VICAT softening temperature significantly higher than propylene copolymers known in the art. Moreover, the propylene copolymers of the invention have improved thermal stability, i.e. they start softening at higher temperatures if compared to conventional propylene copolymers as shown by the lower VICAT indentation values at 120° C.

Preparation of the Films

Test specimens of metallized multilayer films having C/A/B structure were prepared by co-extruding the skin layers B of the Examples 1 and 2 with a commercial propylene homopolymer as base layer A, said homopolymer having the following set of properties:

MFR (ISO 1133: 230° C., 2.16 Kg) of 3.5 g/10 min;
Tensile modulus (ISO 527-1, -2: 1 mm/min) of 1850 MPa;
VICAT softening temperature (ISO 306, A50) of 160° C.;
Xylene soluble fraction at 25° C. less than 2 wt % and with a heal sealable propylene polymer composition as layer C, said propylene polymer composition comprising 35 wt % of a propylene/ethylene copolymer containing 3.2 wt % of ethylene units and 65 wt % of a propylene/ethylene/1-butene terpolymer containing 3.2 wt % of ethylene and 9.2 wt % of 1-butene units, said polymer composition having seal initiation temperature of 105° C.

A Brückner tenter line was used, operating under conventional line conditions.

The multilayer polypropylene films were biaxially oriented at a stretching ratio of 8 in TD and of 5 in MD.

The total film thickness was 18 micron (1/16/1 micron).

The skin layers B of the BOPP films were subjected to flame treatment and subsequently an aluminum layer M was deposited onto the treated surface of the skin layers by vacuum vapor-metal deposition.

A BOPP film was laminated onto the metallized surface of the multilayer BOPP films of Example 1 and 2 using molten LDPE as coating layer.

The BOPP film used for lamination was a multilayer BOPP film (20 micron thick) having a X/Y/X structure, wherein the base layer Y was a propylene homopolymer and the skin layers X comprised blends of copolymers of propylene with ethylene and/or alpha-olefins having 4 to 10 carbon atoms.

The metallized multilayer BOPP films of examples 1 and 2 show good barrier properties to oxygen and water vapor transmission and a good barrier retention, i.e. said properties

TABLE 1

| | | EXAMPLE | | | | |
| --- | --- | --- | --- | --- | --- | --- |
| | | 1 | 2 | Comp. 1 | Comp. 2 | Comp. 3 |
| C4 | wt % | 5.0 | 5.4 | 11.5 | 8.7 | 5.3 |
| C2 | wt % | / | / | / | / | 2.6 |
| XS | wt % | 1.7 | 1.6 | 9.8 | 2.2 | / |
| MFR | g/10 min | 5.0 | 4.0 | 5.5 | 10.0 | 5.0 |
| VICAT temp. | ° C. | 141 | 137 | 125 | 130 | 117 |
| VICAT indentation value at 120° C. | mm | 0.03 | 0.05 | 0.45 | 0.16 | 1.00 |
| Melting temperature | ° C. | 151.5 | 150.4 | 137 | 142 | 132 |
| Crystallization temperature | ° C. | 104.1 | 100.3 | / | / | / |
| Flexural Modulus | MPa | 1122 | 1150 | / | / | / |
| MET | N/mm$^2$ | 1181 | 1050 | 1000 | 1050 | 950 | resulted substantially unaffected by the extrusion lamination of the films with a further plastic layer.

The invention claimed is:

1. A multilayer polypropylene film comprising a base layer A, at least one skin layer B adhered to said base layer A, and a metal layer M deposited on a surface of said skin layer B, wherein said skin layer B comprises a propylene copolymer comprising from 3% to 6% by weight of $C_4$-$C_{10}$ alpha-olefin units, said propylene copolymer further comprising a xylene soluble fraction at 23° C. of less than 4.0 wt %, a VICAT softening temperature higher than 135° C., and an indentation value according to the VICAT test method lower than or equal 0.05 mm at 120° C.

2. The multilayer polypropylene film according to claim 1, wherein said propylene copolymer further comprises a xylene soluble fraction at 25° C. of less than 2.0 wt %.

3. The multilayer polypropylene film according to claim 1, wherein said propylene copolymer further comprises a melting temperature measured by DSC higher than 150° C.

4. The multilayer polypropylene film according to claim 1, wherein said propylene copolymer is a propylene/1-butene copolymer.

5. The multilayer polypropylene film according to claim 1, wherein said base layer A comprises a propylene homopolymer comprising a xylene soluble fraction at 25° C. of less than 5 wt % and/or tensile modulus (TSO 527-1, 1 mm/min) higher than 1500 MPa and/or VICAT softening temperature (ISO 306, A50 (50° C./h 10N)) higher than 155° C.

6. The multilayer polypropylene film according to claim 1, wherein said metal layer M is an aluminum metal layer.

7. The multilayer polypropylene film according to claim 1 further comprising a plastic layer laminated onto a metallized surface of the multilayer polypropylene film.

8. The multilayer polypropylene film according to claim 1, wherein said skin layer B consists of:
   (I) 100 parts by weight of a propylene copolymer comprising from 3% to 6% by weight of $C_4$-$C_{10}$ alpha-olefin units, said propylene copolymer further comprising a xylene soluble fraction at 23° C. of less than 4.0 wt %, a VICAT softening temperature higher than 135° C., and an indentation value according to the VICAT test method lower than or equal to 0.05 mm at 120° C.; and
   (II) up to 0.25 parts by weight, of at least one additive selected from stabilizers, acid scavengers, antiblocking agents, nucleating agents, and combinations thereof.

9. The multilayer polypropylene film according to claim 8, wherein said skin layer B consists of:
   (I) 100 parts by weight of a propylene copolymer comprising from: 3% to 6% by weight of $C_4$-$C_{10}$ alpha-olefin units, said propylene copolymer further comprising a xylene soluble fraction at 23° C. of less than 4.0 wt %, a VICAT softening temperature higher than 135° C., and an indentation value according to the VICAT test method lower than or equal to 0.05 mm at 120° C.; and
   (II) up to 0.18 parts by weight, of at least one additive selected from stabilizers, acid scavengers, antiblocking agents, nucleating agents, and combinations thereof.

10. A multilayer polypropylene film comprising a base layer A, at least one skin layer B adhered to said base layer A, and a metal layer M deposited on a surface of said skin layer B, wherein said skin layer B comprises a propylene/1-butene copolymer comprising from 3% to 6% by weight of 1-butene units, said propylene copolymer further comprising a xylene soluble fraction at 23° C. of less than 4.0 wt %, a VICAT softening temperature higher than 135° C., and an indentation value according to the VICAT test method lower than or equal to 0.05 mm at 120° C.

11. A process for the preparing a metallized multilayer propylene polymer film, the multilayer polypropylene film comprising a base layer A, at least one skin layer B adhered to said base layer A, and a metal layer M deposited on a surface of said skin layer B, wherein said skin layer B comprises a propylene copolymer comprising from 3% to 6% by weight of $C_4$-$C_{10}$ alpha-olefin units, said propylene copolymer further comprising a xylene soluble fraction at 23° C. of less than 4.0 wt %, a VICAT softening temperature higher than 135° C., and an indentation value according to the VICAT test method lower than or equal to 0.05 mm at 120° C.; the process comprising:
   coextrusion of said base layer A and at least one skin layer B;
   treatment of a surface of said skin layer B with surface treatment selected among corona-discharge, corona-discharge in a controlled atmosphere, flame or vacuum plasma to produce a treated skin layer B; and
   deposition of a metal onto a surface of the treated skin layer B.

12. The process according to claim 11 further comprising:
   post-converting said skin layer B deposited with the metal with a treatment selected from extrusion coating, extrusion lamination, adhesive lamination, and combinations thereof.

* * * * *